United States Patent
Budin et al.

(10) Patent No.: US 10,063,410 B2
(45) Date of Patent: *Aug. 28, 2018

(54) AD HOC LOCAL AREA NETWORK CREATION

(71) Applicant: International Business Machines Corporation, Armonk, NY (US)

(72) Inventors: Joseph P. Budin, Concord, MN (US); Jim C. Chen, Rochester, MN (US); Quinton G. Kramer, Elk Mound, WI (US); Justin C. Nelson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,740

(22) Filed: Jan. 31, 2017

(65) Prior Publication Data

US 2018/0219725 A1 Aug. 2, 2018

(51) Int. Cl.
*H04L 12/24* (2006.01)
*H04W 48/16* (2009.01)
(Continued)

(52) U.S. Cl.
CPC .... *H04L 41/0803* (2013.01); *G06F 17/30312* (2013.01); *H04W 48/16* (2013.01); *H04W 60/00* (2013.01); *H04W 84/18* (2013.01)

(58) Field of Classification Search
CPC .......... H04W 4/22; H04W 4/08; H04W 4/02; H04W 84/04; H04W 72/10; H04W 16/14;
(Continued)

(56) References Cited

U.S. PATENT DOCUMENTS 9,014,657 B2 4/2015 Rohde et al.
9,179,475 B2 11/2015 Koleszar et al.
(Continued)

FOREIGN PATENT DOCUMENTS

WO 2007/146818 A2 12/2007
WO 2008/004250 A2 1/2008

OTHER PUBLICATIONS

Cambra et al., "Ad hoc Network for Emergency Rescue System based on Unmanned Aerial Vehicles," Network Protocols and Algorithms, 2015, vol. 7, No. 4, pp. 72-89, Macrothink Institute. DOI: 10.5296/npa.v7i4.8816.
(Continued)

*Primary Examiner* — Oussama Roudani
(74) *Attorney, Agent, or Firm* — Christopher M. Coy

(57) ABSTRACT

A system and method for managing an ad hoc network are disclosed. A boundary for an area to be monitored is defined for the ad hoc network. A number of devices connect with each other to form the ad hoc network. Devices can enter and leave the network as they come into proximity with one of the members of the network. Data is transmitted between the members of the network. This data can include a carrier rating and a data rating about each member of the network as well as data about other devices that the transmitting device had previously come into contact with. The data held by one member about other members is stored and can later be retrieved.

11 Claims, 6 Drawing Sheets

(51) Int. Cl.
*H04W 60/00* (2009.01)
*G06F 17/30* (2006.01)
*H04W 84/18* (2009.01)

(58) Field of Classification Search
CPC . H04W 84/18; H04M 3/5116; H04M 2242/04
See application file for complete search history.

(56) References Cited

U.S. PATENT DOCUMENTS

| | | |
|---|---|---|
| 9,295,011 B1 | 3/2016 | Fix et al. |
| 2006/0009191 A1 | 1/2006 | Malone, III |
| 2008/0143513 A1 | 6/2008 | Hannah |
| 2009/0010258 A1 | 1/2009 | Ayoub et al. |
| 2013/0217332 A1 | 8/2013 | Altman et al. |
| 2014/0011471 A1 | 1/2014 | Khosla et al. |
| 2014/0073283 A1 | 3/2014 | Button et al. |
| 2017/0251347 A1* | 8/2017 | Mehta ............... H04W 4/22 |
| 2017/0330446 A1* | 11/2017 | Thurlow ............. H04W 4/22 |

OTHER PUBLICATIONS

Humphries, M., "TerraNet creates peer-to-peer cellphone network," geek.com, Sep. 12, 2007, 6 pages. http://www.geek.com/mobile/terranet-creates-peer-to-peer-cellphone-network-568085/.

Statt, N., "GoTenna creates a cell network out of thin air anywhere on Earth," c|net News, Jul. 17, 2014, 6 pages. http://www.cnet.com/news/gotenna-creates-cell-network-out-of-thin-air-anywhere-on-earth/.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Accelerated Examination Support Document, U.S. Appl. No. 15/802,186, signed Oct. 23, 2017, 19 pgs.

Budin, et al., "Ad Hoc Local Area Network Creation," U.S. Appl. No. 15/802,186, filed Nov. 2, 2017.

List of IBM Patents or Patent Applications Treated as Related, Oct. 31, 2017, 2 pgs.

* cited by examiner

AD HOC LOCAL AREA NETWORK CREATION

BACKGROUND

The present disclosure is related to the creation of a local area network with mobile devices in potentially dangerous environments.

SUMMARY

The following presents a simplified summary of the disclosure in order to provide a basic understanding to the reader. This summary is not an extensive overview of the disclosure and it does not necessarily identify key features or essential features of the invention, nor does it delineate the scope of the invention. Its sole purpose is to present some concepts disclosed herein in a simplified form as a prelude to the more detailed description that is presented later.

The present disclosure provides a system and method for managing devices in an ad hoc network. A boundary of the area to be included is defined for the ad hoc network. A number of devices can connect and form the network. The system and method includes collecting data from the registered nodes, and storing data collected from the registered nodes in a database.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
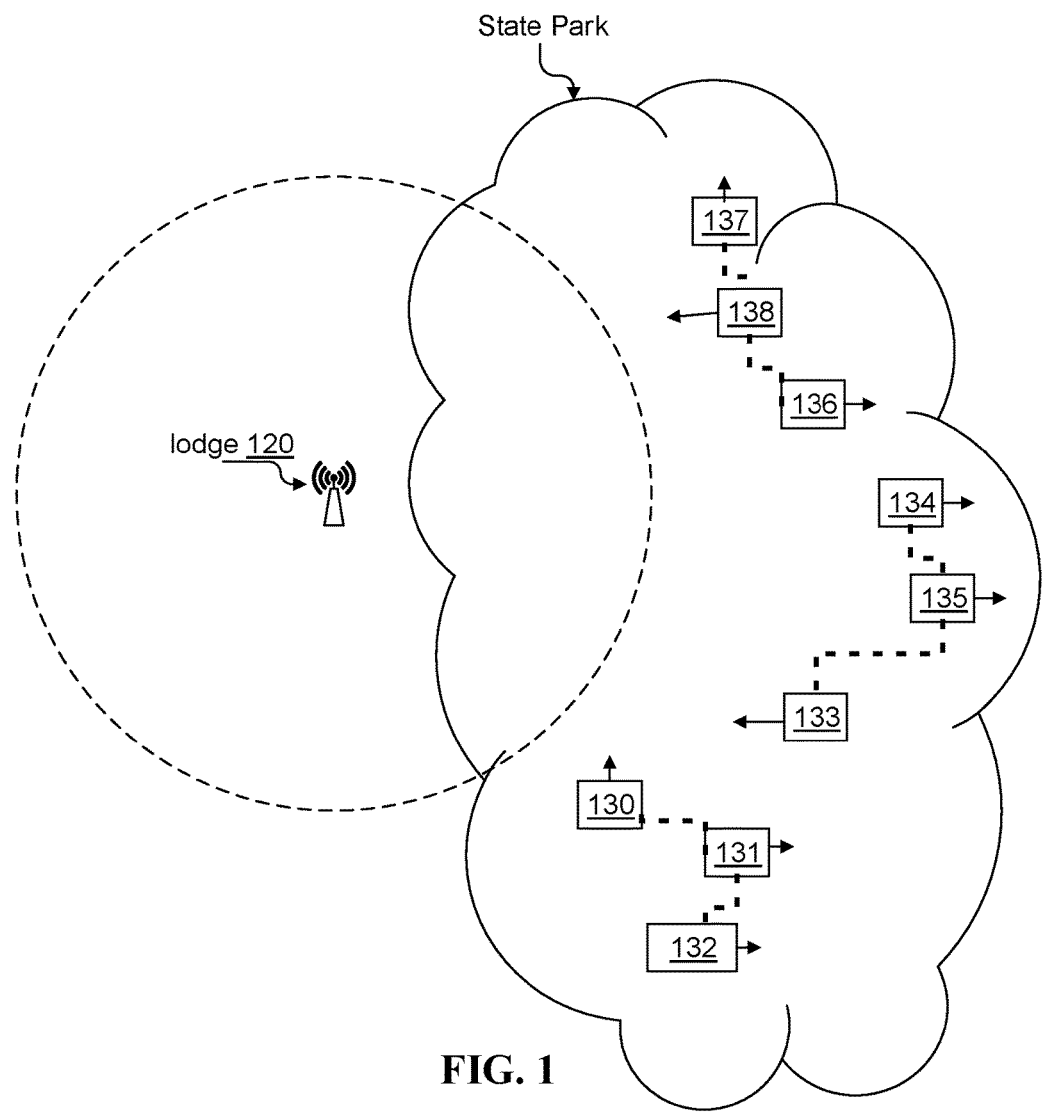
FIG. 1 is a diagrammatic representation of the present disclosure in a real-world environment, according to some embodiments.

While the invention is amenable to various modifications and alternative forms, specifics thereof have been shown by way of example in the drawings and will be described in detail. It should be understood, however, that the intention is not to limit the invention to the embodiments described. On the contrary, the intention is to cover all modifications, equivalents, and alternatives falling within the spirit and scope of the invention.

DETAILED DESCRIPTION

Prior to discussing the details of the present disclosure exemplary embodiments are provided to illustrate the disclosure.

FIG. 1 is a diagrammatic illustration of an ad hoc network in a real-world implementation of the present disclosure. In this example the network is deployed in a state park. However, other implementations of the network can be deployed in any environment or location where standard networks are not available or have limited connectivity, such as a mountain range, a ski slope, a beach, a desert, a jungle, etc.

To assist in better understanding the present disclosure, three example implementations of the disclosure are given hereafter to help illustrate the functionality and diversity of the disclosure. The example implementations that follow include the interactions of snowmobilers within a state park. The groups 130-138 in FIG. 1 each represent one or more snowmobilers that are at various locations in a state park. A single member in a group can have one or more devices that can network with each other. Devices in the group can include devices such as cell phones, wearables, devices embedded in the equipment used by the group, or any other suitable device. The devices include an application that is executed by the device to form and maintain a mesh network via wireless protocol, such as Bluetooth. The mesh network is a network topology in which each node relays data for the network. This application can be downloaded to the device or may be preloaded such as when the device is embedded in the equipment. For example, the state park has a sign that instructs visitors to download an application to their devices before entering the park. Each group in FIG. 1 includes a group number and an arrow. The arrow illustrates the direction that the group is traveling.

In a first example, group 130, group 131, and group 132 collectively represent three groups of snowmobilers who are exploring a remote corner of the state park. Group 130 is on their way back to the lodge 120, while Groups 131 and 132 are heading into the park. While group 130 is passing groups 131 and 132, unbeknownst to them, their devices connect, form a mesh network, and transmit information to the other devices of the other groups, data transfer between the devices is discussed in greater detail below. This data can include data such as location, location history, accelerometer history, health, or other status levels. (e.g., fuel levels). As group 130 approaches the lodge 120, again unbeknownst to them, their data is retrieved and stored in a database.

After groups 132 and 131 do not return to the lodge as expected, information retrieved by group 130 is used by authorities to determine an efficient search area that allows the snowmobilers represented by groups 131 and 132 to be found stranded due to a rockslide that disabled their snowmobiles and devices. In this example, it should be noted that the location of a group whose devices are disabled was presumed to be its most recently transmitted location.

In another example, a group of people represented by group 133 is unaware of two other groups of people, represented by groups 134 and 135, that are close enough to each other for their devices to connect and form a mesh network. Groups 134 and 135 are each near a canyon edge to the north east of group 133. The three group's devices all connect and data is transmitted and received between them. Group 133 is on their way back to the lodge. After group 134 and 135 do not return to the lodge within the planned time, information retrieved by group 133 is used to determine the location of groups 134 and 135. Authorities come to find that groups 134 and 135 have fallen and are stranded at the bottom of a ravine close to where group 133 received their data. In this example, it should be noted that information transfer can occur without the user knowing.

In another example group 136 passes group 137, and unbeknownst to either party, their devices connect and form a mesh network. Data is shared between the devices of the two groups. Specifically, group 136 shares its data with group 137, and group 137 shares its data with group 136. Later, group 137 passes group 138, and the devices of these two groups connect and form a mesh network. While connected in a mesh network the devices of group 137 transmit their data, as well as the data that was received from group 136, to group 138. Simultaneously, the devices of group 138 transmit their data to group 137 (as well as data related to any other group they may have previously connected with). The groups continue in different directions. As group 138 approaches the lodge 120, unbeknownst to the members of group 138, the devices connected to the network. The data stored on their devices regarding group 136 and 137 is transmitted to a server, and stored in a database. Specifically, the data regarding groups 136 and 137 is transmitted to the server, and stored in the database. Thus, group 138 was able to transmit data regarding group 136 without ever having come into contact with group 136. While three groups are illustrated in this example, it should be understood that any number of groups could have acted as intermediaries for this data, that is group 136's data could have passed through n-groups prior to arriving at group 138. The system can process the data on the back end and store the data as appropriate. Information that may be transmitted in this approach can include the history of the groups that the data associated with group 136 has passed through. In this way, the system can determine the carrier and data rating associated with each group's data. As discussed in further detail below, the data rating associated with group 136 may carry a higher data rating than group 137, as group 138 did not come into contact with group 136.

Figure 2:
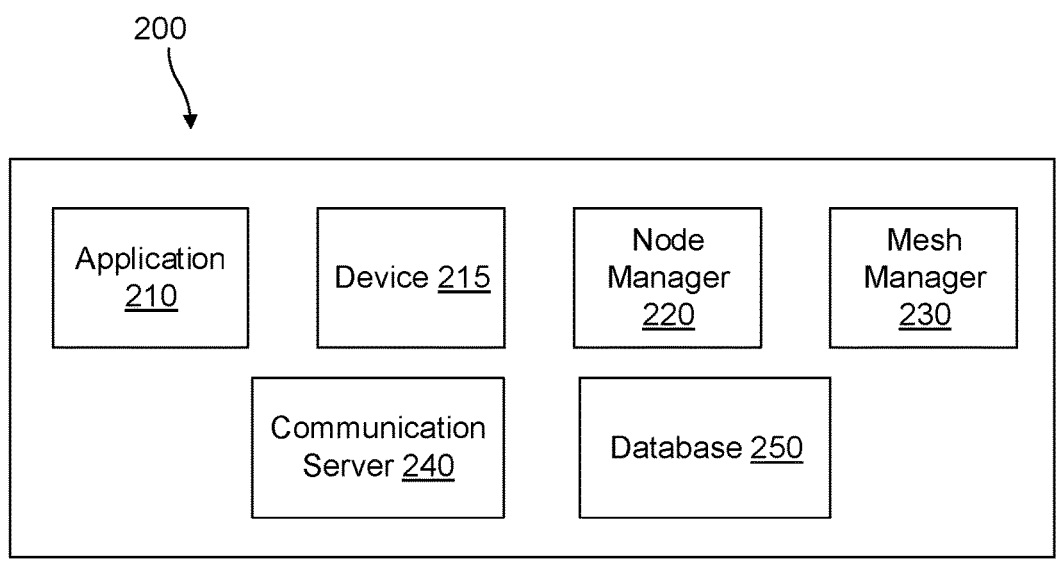
FIG. 2 is a block diagram illustration of a system configured to manage mobile devices in a mesh network, according to some embodiments.

FIG. 2 is a block diagram illustrating a system 200 configured to manage mobile devices in an ad hoc mesh network according to one illustrative embodiment. The mesh network is a network topology in which each node relays data for the network. All mesh nodes can cooperate in the distribution of data in the network. System 200 includes an application 210, a device 215, node manager 220, mesh manager 230, a communication server 240, and a database 250. The system 200 also includes at least one processor and at least one memory component.

A node can comprise one or more members. A node can represent, for example, a single snowmobiler traveling alone. Conversely, a node can also represent four snowmobilers traveling together in a group, as discussed above. The nodes can include mobile devices such as cell phones, wearables, drones, or could be devices embedded in the equipment used by the members of the node. Embedded devices can include cellular, satellite, or other wireless communication devices, or any other device that could function as an embedded device in the present disclosure. Therefore, in some embodiments, the node represents the person or group of persons carrying the device or devices, and in other embodiments, the node represents the device (or group of devices) itself. Some embodiments include nodes that are immobile devices such as wireless access points, cellular telephone transceivers, or buildings that include any of the above immobile devices.

Application 210 is a software program that allows the various nodes in the system 200 to communicate with each other and form and maintain a mesh network. The application 210 can be configured by the mesh manager 230 to be delivered to a node as needed for participating in the mesh network. In some embodiments, application 210 can be configured for use in an immobile device. In some embodiments, the application 210 is part of the node manager 220.

Device 215 is a device that acts as a node in the system 200. The device 215 can include a cell phone, a wearable, a drone, or could be a device embedded in equipment used by the members of the node. While device 215 can be illustrated as a single device, in some embodiments, device 215 includes a number of different devices. For example, a single person can include a plurality of devices such as an embedded device (in a snowmobile), a cell phone, and also a wearable device, and these devices pertaining to a single person can in some embodiments be collectively "device 215". In some embodiments, the device 215 connects to other devices using a Bluetooth protocol. In other embodiments, any other protocol that permits two devices to connect may be used. The device 215 can be configured to include the application 210, the node manager 220, and the mesh manager 230.

Node manager 220 is a component of the system 200 that is configured to instruct the application 210 to collect and aggregate data retrieved by the device 215 and to connect the application 210 with the mesh manager 230 at the device level. The node manager 220 is configured to monitor the available resources of a device 215. The node manager 220 receives data from the device 215. Data received can include any information received by the device 215 or any component of the device 215 such as: GPS information, e.g., location, location history, orientation, elevation, position, speed, etc; accelerometer information; audio and video, etc. In some embodiments, the node manager 220 receives data acquired from other devices when device 215 was in a prior mesh network. In some embodiments, the node manager 220 is a component of the application 210. The node manager 220 can also receive accelerometer data from the device 215. Accelerometer data can be processed by either the application 210 or the mesh manager 230, or both, and may be used to determine types of movement such as running, falling, being involved in a rockslide or avalanche, etc., or even lack of movement. In some embodiments, the node manager 220 is configured to instruct the application 210 to send camera data to the mesh manager 230. Camera data can include any data retrieved by the camera, for example, photographic data or light intensity data. The node manager 220 can be configured to instruct the application 210 to send sound information retrieved from a microphone. In some embodiments, the node manager 220 can be configured to send data related to dynamic and static network connections and their respective carrier location data to the mesh manager 230. In some embodiments, the node manager 220 can be configured to transmit data as it is generated and collected by the application 210. After receiving the data, the node manager 220 can then instruct the application 210 to compile the data into a data aggregate. In some embodiments, the data aggregate can contain information about a particular node, can contain information received by the particular node about other nodes obtained in a prior mesh, can contain information obtained from other nodes that the particular node did not have contact with, and/or any combination of the above. In some embodiments, the application 210 can compile or assemble data into the data aggregate autonomously. The node manager 220 can then send that data aggregate to the mesh manager 230.

In some embodiments, the node manager 220 is configured to determine when the data aggregate is to be sent to the mesh manager 230 based on a plurality of thresholds. The threshold can be related to any feature measurable by a component of the device 215, such as, a detected sound intensity, an accelerometer information, a light intensity (or lack thereof), a GPS change in position over time, etc. For example, the node manager 220 may be configured to receive instruction to only send particular types of information to the mesh manager 230 when a threshold intensity of a component measurement is met. The threshold intensity of a component measurement can include measurements taken by any component of the device 215. For example, a minimum amount of force measured by an accelerometer, can indicate an intense fall, the intensity of light measured by a camera, can indicate the device 215 is buried under dirt or snow, the intensity of sound measured by a microphone, can indicate an avalanche or rockslide, or the speed determined by GPS, can indicate that the device 215 is traveling down a mountain in avalanche debris, or any other type of information that can be measured by the device 215 which can be used to determine if a dangerous event has occurred to the user of a device 215. In some embodiments, some types of data may require a threshold to be met for the node manager 220 to send the data to the mesh manager 230 while other types of data may be sent regardless of whether a threshold is met. For example, some types of data may be memory intensive, and transmission of that data may require high amounts of bandwidth and may only become pertinent under certain circumstances, e.g., video files. Conversely, other types of data may not be quite as memory demanding and still provide high value information, e.g., GPS coordinates.

In some embodiments data related to network connections such as dynamic and static network connections, (e.g., wireless networks, cellular networks, etc.) and their respective carrier location, can be used by the mesh manager 230 to determine a location and/or change in position over time of the node. The node manager 220 can be configured to transmit a data aggregate collected by the node manager 220 to the mesh manager 230. A data aggregate can include a collection or packet of the most recent information gathered by the node manager 220. The node manager 220 can be configured to update the collection of data in the data aggregate periodically. For example, every 1, 5 or 10 minutes, however any time can be used. In some embodiments, the node manager 220 is configured to have a data aggregate prepared so that when a mesh connection is made, however briefly, the node manager 220 transmits the data aggregate to the mesh manager 230.

The mesh manager 230 is a component of the system 200 that is configured to administer the formation and upkeep of the mesh network. The mesh manager 230 processes data received from the node manager 220. The mesh manager 230 determines where to store data based on a prioritization of the data. The mesh manager is configured to define the boundaries of the area that is being monitored. For example, a state park, a skiing resort, a city block, etc. The boundary can be defined based on location, distance from the nearest hospital, retrieved from a database of location boundaries, signal strength of the mesh network, user defined, or any other method of defining boundaries. The mesh manager 230 is configured to identify and locate in relation to nodes in the mesh network, dynamic or static connections available. For example, wireless LAN, cellular networks, satellite, etc. The mesh manager can be configured to accept and register nodes into the mesh network in a manner that is autonomously self-forming and dynamic.

The communication server 240 is a component of the system 200. The communication server 240 handles the receipt of data from the mesh manager 230. The communication server 240 directs the storage of data received from the mesh manager 230 into the database 250. The communication server 240 maintains reference data for all data deposited in the database 250 for retrieval as necessary for data processing. In some embodiments, the database 250 can be organized or partitioned into separate databases. In other embodiments, the data can all be kept on database 250. In some embodiments, separate databases can be used to separate or organize data likely to be accessed and analyzed, such as newly acquired data, from older data that is less likely to be further analyzed. In some embodiments data in the database 250 can be organized into either an action database partition or an archive database partition. In some embodiments, data can be always sent to the action partition, unless a threshold time is met or exceeded. In those embodiments, if the threshold time is met or exceeded the data can be sent to the archive partition. In some embodiments, the threshold time can be configured by an administrator. In some embodiments when a threshold time is met for data saved in the action partition on the database 250, that data can be configured to be transferred to the archive database partition by the communication server 240.

Figure 3:
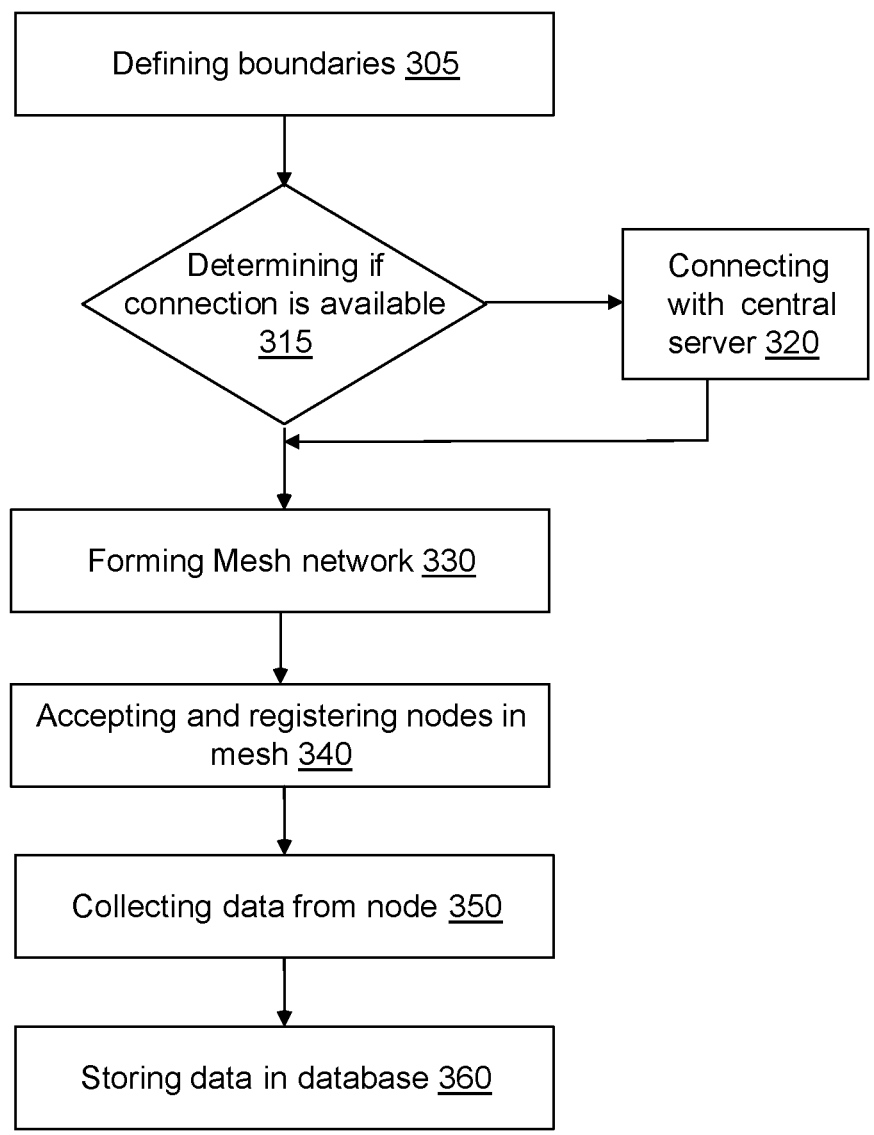
FIG. 3 is a block diagram illustration of a process for forming and managing a mesh network, according to some embodiments.

FIG. 3 is a flow diagram illustrating a process 300 for initializing and forming an ad hoc mesh network. Process 300 begins by defining boundaries of the area being monitored, this is illustrated at step 305. The area being monitored can be geographical, user defined, population defined, politically defined, etc. At this step the process begins by defining boundaries of the area being monitored in various ways that will be explained further. In some embodiments, the mesh manager can retrieve boundary defining instructions from the network connection. In some embodiments, a GPS service can be included in defining the boundary. In some embodiments, the boundary of the area being defined is based on the area encompassed by the mesh network signal. In other embodiments, the boundary can simply be a predetermined radius, such as 500 feet, 1000 feet, 1 mile, 5 miles, etc. In some embodiments, the user can download a map of an area to be visited with the application 210 of the user's mobile device and the application 210 of the user's mobile device can receive instructions defining the boundary. In some embodiments, the defined boundary can depend on the time of the year. For example, the winter season may provide a much different environment with its own set of dangers, than the summer season, etc.

Following the defining of boundaries, a determination of whether any network connections are available is made. This is illustrated at step 315. At this step the node manager 220 receives information regarding any network connections available to the node. Network connections can include static and/or dynamic network connections. These network connections can be wireless and can include cellular, Wi-Fi, satellite, or any other wireless protocol. In some embodiments, the node may have a wired connection.

In some embodiments, if a determination is made that a network connection is available, then the node manager is configured to attempt to connect to the network. When the network connection is formed, the node manager can be configured to make a connection with the central server 320. In some embodiments, the mesh manager can be configured to make the network connection. In some embodiments, the mesh manager can be configured to make the connection to the central server. This is illustrated at step 320. After the connection with the central server is made, the process continues to step 330. In some embodiments if a network connection is not available, then the process continues to step 330. It should be noted that regardless of whether a connection is available, the process forms the mesh network at step 330. It should also be noted that the step of determining if a connection is available 315 can be repeated, and can be occur at any step of the process.

The process continues by forming a mesh network. This is illustrated at step 330. At this step the mesh manager 230 will monitor any other devices in proximity to the node. The mesh manager 230 is configured to attempt forming a mesh connection to any device running the application 210.

Following the formation of the mesh network, nodes are accepted and registered into the mesh. This is illustrated at step 340. As the mesh manager 230 detects the proximity of a device node, the detected node is accepted and registered into the mesh network. As nodes are registered into the mesh network, a data rating and a carrier rating are determined for the node. In some embodiments, the data rating and carrier rating can each be determined by the node manager. In other embodiments, the data rating and carrier rating can each be determined by the mesh manager. In still other embodiments, the mesh manager and data manager can determine the data rating and carrier rating together. Likewise, when a device leaves the proximity of the mesh network the mesh manager 230 removes the node from the mesh network.

A data rating can indicate how the mesh manager prioritizes data. In some embodiments, a node can have a high data rating if it has not been in contact with a network connection for a certain period of time. In some embodiments, a node can have a high data rating if the node is a long distance away from a cellular or other network connection. In other embodiments, a node can have a high data rating if it is an abnormally dangerous area. In other embodiments, a node can have a high data rating if it carries data that it retrieved from a node that had a high data rating. In some embodiments, the data rating can be directly used to determine carrier rating.

Similar to the data rating, a carrier rating can be an indicator of the strength of a signal a node has to a network connection. In some embodiments, the carrier rating can indicate how close a node is to a network connection. For example, a node might have a higher carrier rating if it is closer to a cellular phone tower than a node might have if it is further from a cellular phone tower. Therefore, a high carrier rating can be an indicator of a node that is more reliable for receiving data from nodes with a high data rating. This allows the process to move data with a high data rating to nodes with a high carrier rating. Thereby prioritizing data with a high data rating being transferred to nodes with a high carrier rating. This increases the likelihood that data will be safely received by a central server. In some embodiments, the mesh manager prioritizes the transmission of data with a high data rating to nodes with a higher carrier rating than to nodes with a lower carrier rating. In some embodiments, a low carrier rating can be an indicator of the likelihood of a node losing a network connection.

Following the accepting and registering of the node in the mesh network, data is collected from the node and transmitted to the mesh manager 230. This is illustrated at step 350. At this step the node manager 220 has been configured to prepare a data aggregate for transmission to the mesh manager 210. This step begins by the mesh manager 230 causing a determination to be made as to whether a node has a data rating above a threshold. In one embodiment, if the mesh manager 230 determines that the data rating on a particular node is above a threshold, the data aggregate on that node is retrieved by the mesh manager 230 of the mesh network. In another embodiment, if the mesh manager 230 determines that the data rating on a particular node is above a threshold, the data aggregate on that node is sent to the mesh manager 230.

In some embodiments, the data aggregate on a node is retrieved by the mesh manager 230 if the nodes carrier rating is above a threshold. In some embodiments, the data aggregate on a node is retrieved by the mesh manager 230 if the nodes data rating is above a threshold. In other embodiments, the data aggregate on a node is sent to the mesh manager 230 if the nodes carrier rating is above a threshold. In other embodiments, the data aggregate on a node is sent to the mesh manager 230 if the nodes data rating is above a threshold.

In some embodiments, the data aggregate on a node is retrieved by the mesh manager 230 if the nodes carrier rating is below a threshold. In some embodiments, the data aggregate on a node is retrieved by the mesh manager 230 if the nodes data rating is below a threshold. In other embodiments, the data aggregate on a node is sent to the mesh manager 230 if the nodes carrier rating is below a threshold. In other embodiments, the data aggregate on a node is sent to the mesh manager 230 if the nodes data rating is below a threshold.

In some embodiments, if the data rating or carrier rating of a node is not above a threshold, the data aggregate on that node is not retrieved by the mesh manager 230. In another embodiment, if the data rating or carrier rating of a node is not above a threshold, the data aggregate on that node is not sent to the mesh manager 230. In some embodiments, the data aggregate on a node is retrieved by the mesh manager 230 regardless of the data or carrier rating of that node. In other embodiments, the data aggregate on a node is sent to the mesh manager 230 regardless of the data or carrier rating of that node.

In some embodiments, the data aggregate on a node is only sent to the mesh manager 230 if both the data rating and carrier rating of that node meet or exceed a threshold. In other embodiments, the data aggregate is only retrieved by the mesh manager 230 if both the data rating and carrier rating meet or exceed a threshold.

After data is received by the mesh manager 230 the data is then stored for later retrieval and processing. This is illustrated at step 360. In some embodiments, the data can be stored in a single database. In other embodiments, the data can be stored in two or more different databases. In some embodiments, the data can be organized and stored on a time scale. For example, data can initially be stored in an active database for a period of time, and then moved to an archive database after the period of time. In some embodiments, the period of time can independently be 24 hours, 2 days, 3 days, 30 days, or any other period of time. In some embodiments, the period of time can be determined by the user. In some embodiments, the data can be stored for a period of time in the database and then deleted. In some embodiments, the application provides the user an interface or option to have their data deleted or removed from the system.

Figure 4:
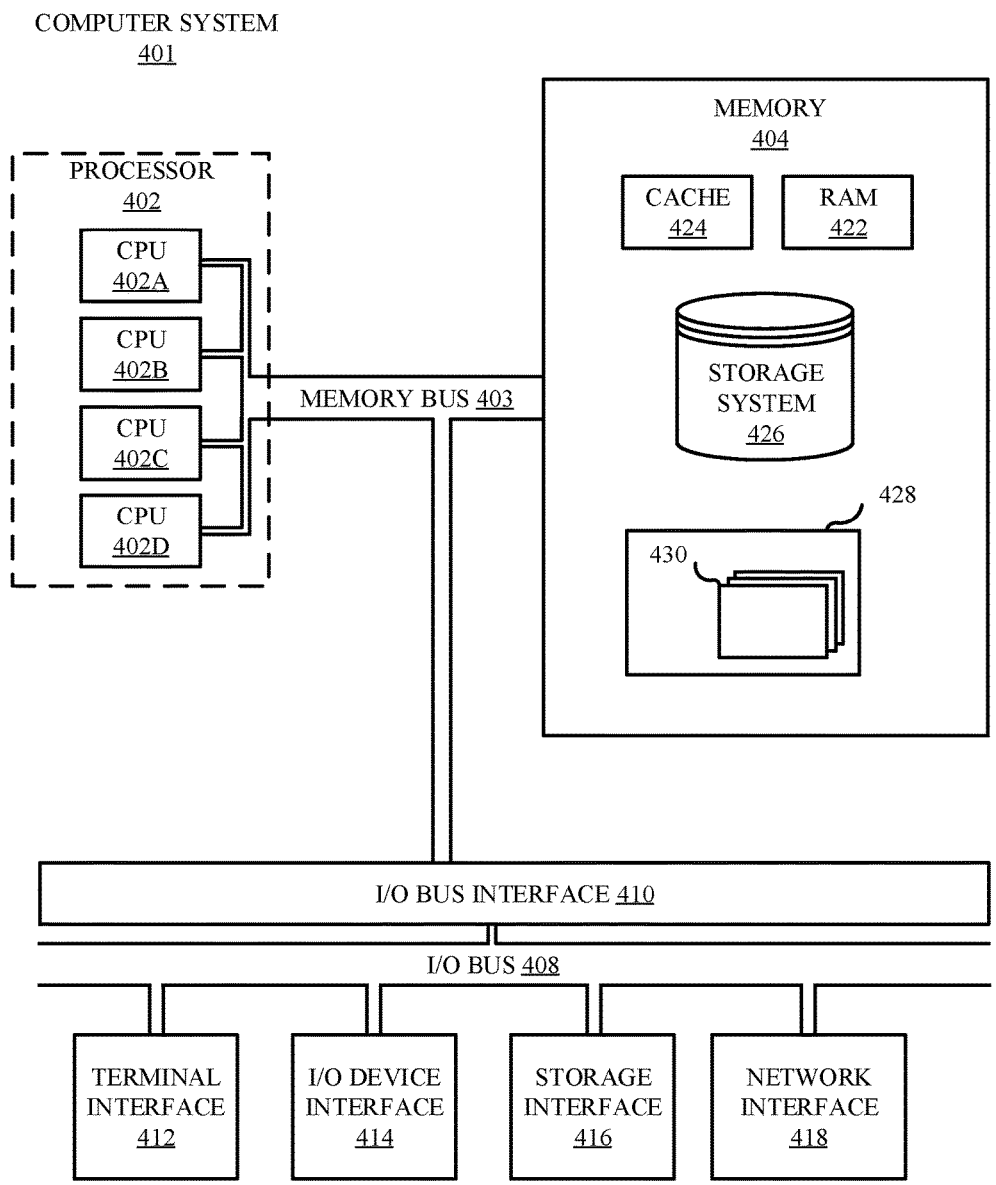
FIG. 4 is a block diagram illustration of a computer system, according to some embodiments.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the modules 430 may include instructions that perform the steps of the process 300 shown in FIG. 3.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
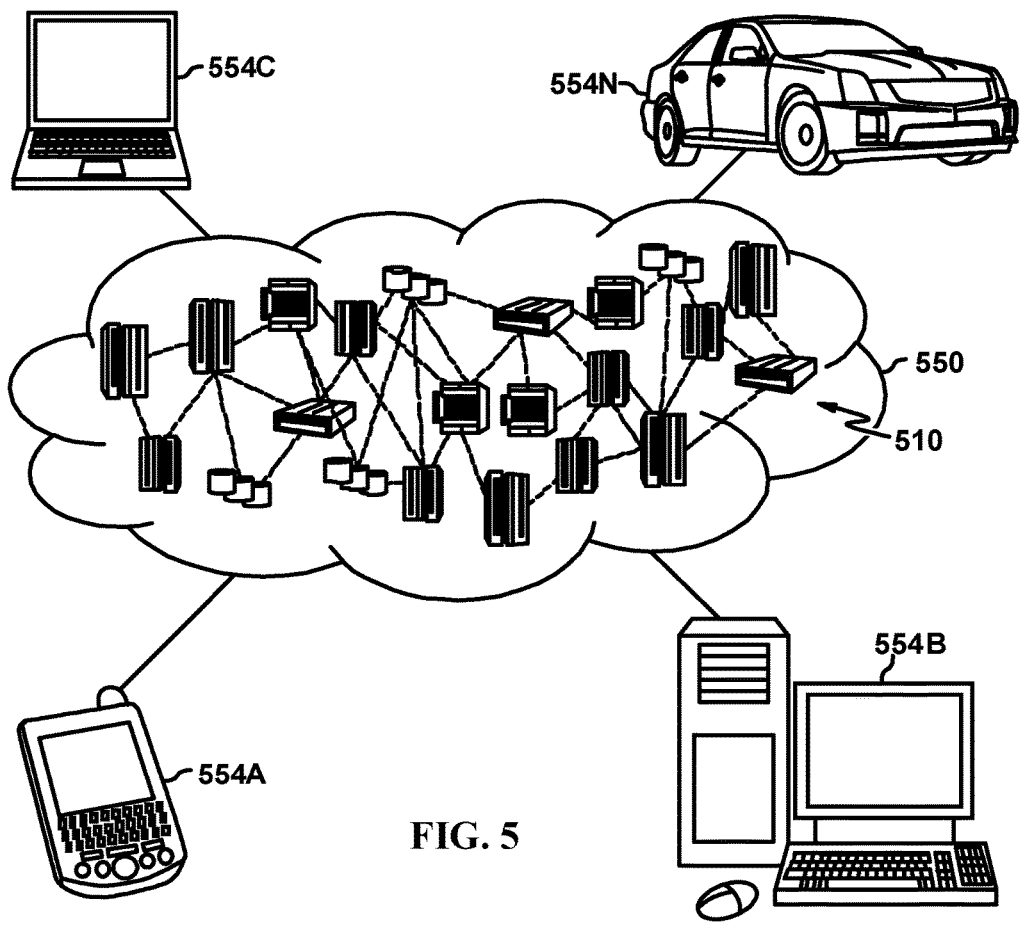
FIG. 5 depicts a cloud computing environment according to embodiments of the present disclosure.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 1 are intended to be illustrative only and that computing nodes 510 and cloud computing environment 550 can communicate with any type of computerized device over any type of network and/or network addressable connection (e.g., using a web browser).

Figure 6:
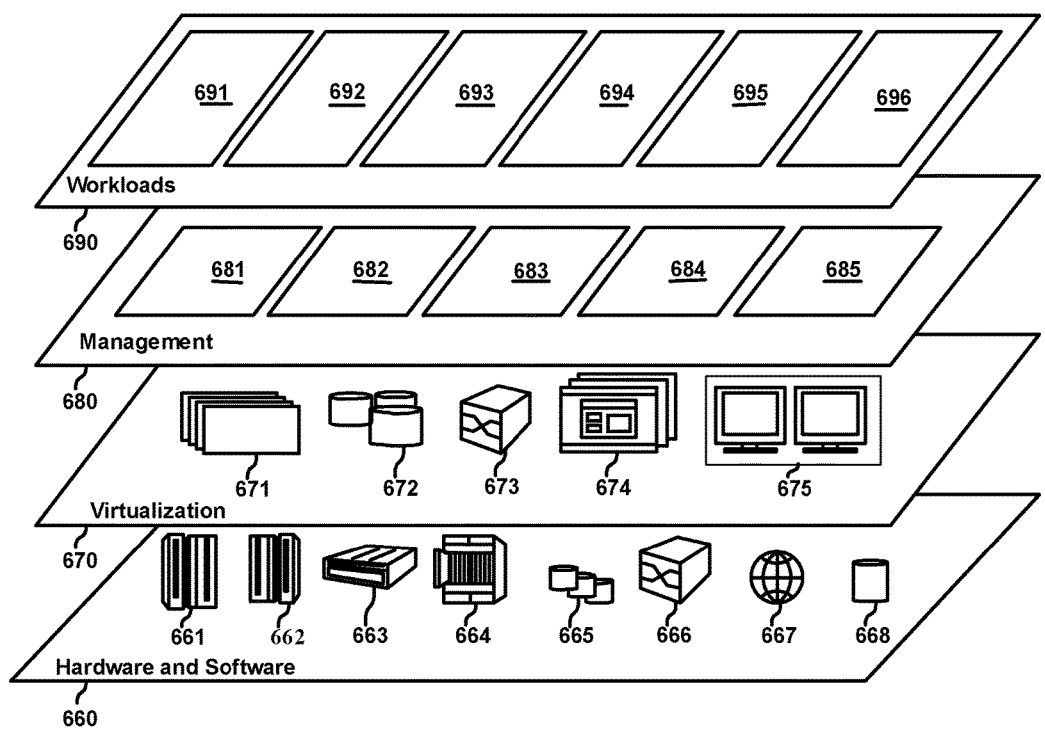
FIG. 6 depicts abstraction model layers according to embodiments of the present disclosure.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and selection of action 696.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system configured to manage devices in an ad hoc network comprising:
   at least one processor;
   at least one memory, the at least one memory having program instructions embodied therewith, the program instructions executable by the at least one processor to cause the at least one processor to:
   initialize and maintain the ad hoc network;
   maintain a database of a data rating and a carrier rating of each device of a plurality of devices;
   maintain a connection of a device to the ad hoc network and send a locally acquired data to a mesh manager;
   receive a set of accumulated data that includes GPS data, accelerometer data, microphone data, and camera data for a plurality of registered devices;
   prioritize the accumulated data within the set of accumulated data received from the plurality of registered devices according to the carrier rating and the data rating of each respective device in the plurality of registered devices,
   wherein the carrier rating for accumulated data from a respective device is a numerical indication of a probability of the accumulated data carried by the respective device getting sent to a network database, wherein the probability is calculated and assigned based upon a distance between the respective device and a communication hub, wherein the carrier rating of the respective device decreases as the distance from the respective device to the communication hub increases,
   wherein the data rating for accumulated data from the respective device is a numerical indication of an importance of the accumulated data carried by the respective device, wherein the data rating of the accumulated data being carried by the respective device increases as the respective device accumulates additional data from devices with low carrier ratings,
   wherein as the carrier rating of the respective device decreases, the data rating of the accumulated data of that respective device correspondingly increases;
   determine, in response to prioritizing the accumulated data within the set of accumulated data, a priority order for the respective accumulated data within the set of accumulated data; and
   send, in response to connecting to a communication server, the set of accumulated data to the network database communicatively coupled to the communication server, wherein the accumulated data within the set of accumulated data is sent according to the priority order of the accumulated data, wherein the accumulated data of the set of accumulated data having a higher priority is sent before the accumulated data of the set of accumulated data having a lower priority.

2. The system of claim 1, wherein the program instructions are further executable by the at least one processor to cause the at least one processor to receive information from the mesh manager.

3. The system of claim 1, wherein the program instructions are further executable by the at least one processor to cause the at least one processor to communicate directly with a device manager to direct mesh data traffic to the network database.

4. The system of claim 1, wherein the program instructions are further executable by the at least one processor to cause the at least one processor to provide to a device, a device manager.

5. The system of claim 1, wherein the program instructions are further executable by the at least one processor to cause the at least one processor to maintain communication to any existing static and dynamic network.

6. The system of claim 1, wherein the network database is an action database.

7. The system of claim 1, wherein the network database is an archive database.

8. A method for managing devices in an ad hoc network, the method comprising:
   defining boundaries of an area to be included in the network;
   forming the network;
   accepting and registering devices into the network;

receiving a set of accumulated data that includes GPS data, accelerometer data, microphone data, and camera data for the plurality of registered devices;

prioritizing the accumulated data within the set of accumulated data received from the registered devices according to a carrier rating and a data rating of each registered device, wherein the carrier rating for accumulated data from a respective device is a numerical indication of a probability of the accumulated data carried by the respective device getting sent to a network database, wherein the probability is calculated and assigned based upon a distance between the respective device and a communication hub, wherein the carrier rating of the respective device decreases as the distance from the respective device to the communication hub increases, wherein the data rating for accumulated data from the respective device is a numerical indication of an importance of the accumulated data carried by the respective device, wherein the data rating of the accumulated data being carried by the respective device increases as the respective device accumulates additional data from devices with low carrier ratings, wherein as the carrier rating of the respective device decreases, the data rating of the accumulated data of that respective device correspondingly increases;

determining, in response to prioritizing the accumulated data within the set of accumulated data, a priority order for the respective accumulated data within the set of accumulated data; and sending, by a particular device and in response to connecting to a communication server, the set of accumulated data to the network database communicatively coupled to the communication server, wherein the accumulated data within the set of accumulated data is sent according to the priority order of the accumulated data, wherein the accumulated data of the set of accumulated data having a higher priority is sent before the accumulated data of the set of accumulated data having a lower priority.

9. The method of claim 8, further comprising:
determining if a network connection is available.

10. A computer program product comprising a computer readable storage medium having program instructions embodied therein, the program instructions executable by a first computing device to perform a method comprising:

defining boundaries of an area to be included in an ad hoc network;

forming the network;

accepting and registering devices into the network;

receiving a set of accumulated data that includes GPS data, accelerometer data, microphone data, and camera data for the plurality of registered devices;

prioritizing the accumulated data within the set of accumulated data received from the registered devices according to a carrier rating and a data rating of each registered device, wherein the carrier rating for accumulated data from a respective device is a numerical indication of a probability of the accumulated data carried by the respective device getting sent to a network database, wherein the probability is calculated and assigned based upon a distance between the respective device and a communication hub, wherein the carrier rating of the respective device decreases as the distance from the respective device to the communication hub increases, wherein the data rating for accumulated data from the respective device is a numerical indication of an importance of the accumulated data carried by the respective device, wherein the data rating of the accumulated data being carried by the respective device increases as the respective device accumulates additional data from devices with low carrier ratings, wherein as the carrier rating of the respective device decreases, the data rating of the accumulated data of that respective device correspondingly increases;

determining, in response to prioritizing the accumulated data within the set of accumulated data, a priority order for the respective accumulated data within the set of accumulated data; and sending, by a particular device and in response to connecting to a communication server, the set of accumulated data to the network database communicatively coupled to the communication server, wherein the accumulated data within the set of accumulated data is sent according to the priority order of the accumulated data, wherein the accumulated data of the set of accumulated data having a higher priority is sent before the accumulated data of the set of accumulated data having a lower priority.

11. The computer program product of claim 10, further comprising:
determining if a network connection is available.

* * * * *